United States Patent [19]
Hong

[11] Patent Number: 5,954,399
[45] Date of Patent: Sep. 21, 1999

[54] LUMBAR SUPPORT FOR A CAR SEAT

[76] Inventor: Jung-myung Hong, 1501-202, Seongjeo Village, 2115 Deahwa-dong, Ilsan-gu, Koyang-shi, Kyunggido, Rep. of Korea, 411-410

[21] Appl. No.: 09/115,483

[22] Filed: Jul. 15, 1998

[51] Int. Cl.$^6$ ............................... A47C 7/46; B60N 2/22
[52] U.S. Cl. ..................................... 297/284.4; 297/284.8
[58] Field of Search .............................. 297/284.4, 284.8

[56] References Cited

U.S. PATENT DOCUMENTS

| | | | |
|---|---|---|---|
| 5,050,930 | 9/1991 | Schuster et al. | 297/284.4 |
| 5,197,780 | 3/1993 | Coughlin | 297/284.4 X |
| 5,651,583 | 7/1997 | Klingler et al. | 297/284.4 |
| 5,769,490 | 6/1998 | Falzon | 297/284.4 |
| 5,823,620 | 10/1998 | Le Caz | 297/284.4 |

FOREIGN PATENT DOCUMENTS

| | | | |
|---|---|---|---|
| 1274003 | 7/1968 | Germany | 297/284.4 |
| 95/00053 | 1/1995 | WIPO | 297/284.4 |

*Primary Examiner*—Peter R. Brown
*Attorney, Agent, or Firm*—Madson & Metcalf

[57] ABSTRACT

A lumbar support for a car seat including a wire frame which is made of an endless wire member, has two hold parts set at two seat frames of a squab of a seat by two connecting means and a guide part integrating with the hold parts, a support plate which is made of an elastic leaf spring material, has two flanges formed at both end parts thereof, and is projected in a middle part of the support plate by making narrow the distance between the flanges, and an adjustor for adjusting the height of the projected part of the support plate by handling a handle of the adjustor.

The lumbar support can be manufactured as a standardized lumbar support, mounted on the seat easily, used in various types of vehicles for common use, semi-permanently used as made of a special steel material, easily change the setting location of the handle of the adjustor, more comfortably support the occupant's lumbar since having a good spring cushion function, reduce the occupant's fatigue during a long distance travel, and improve its safety as having a shock absorbing effect in case of a collision.

20 Claims, 7 Drawing Sheets

LUMBAR SUPPORT FOR A CAR SEAT

FIELD OF THE INVENTION

This invention relates to a lumbar support for a car seat, and more particularly to, a lumbar support for a car seat which may provide a comfortable seating feeling to an occupant and reduce the occupant's fatigue during travelling, since comfortably supporting the occupant's lumbar and absorbing the vibration and/or the shock from travel on a road surface and a car collision.

DESCRIPTION OF THE PRIOR ART

In general, a driver's seat is separated from a seat next to the driver by a consol box. The separate seats must be designed so as to absorb the vibration and/or the shock from a road surface, support an occupant's body well to minimize an occupant's fatigue by travelling for a long time and to provide comfort to the occupant, and reduce the weight and the cost since the weight and the production cost occupy a considerably high rate in the whole rate. Also, the separate seats must be designed in relation to due consideration of the occupant's seating feeling in a stationary state, and in a smooth movement or a sudden start/stop of a car, and a support power for safely holding the occupant on the seat when turning the winding road.

The conventional seat comprises a seat cushion, a squab and a head restraint. The seat cushion and the squab which comprise a seat frame, a seat spring mounted on the seat frame, and a trim cover assembly mounted on the seat spring therein, are widely used. The squab further includes a lumbar support fixed at the seat frame therein. The lumbar support serves for supporting the occupant's lumbar in order to reduce the occupant's fatigue during driving for a long time.

The conventional lumbar support which is made of rigid materials without a resilient power and shapes into an arc form is mounted at a location corresponding to the occupant's lumbar part on the seat frame. The lumbar support has a two stepped variable structure which allows the lumbar support to project toward the occupant's lumbar part from its normal height to a prescribed height by a lever which is exposed to one side of the seat. However, the lumbar support is complicated in its construction in spite of the two stepped variable structure.

The conventional lumbar support has a disadvantage that the height of a projected part thereof can not be precisely adjusted to fit the occupant's body condition well, so that the occupant can not sit on the seat in a comfortable position and it may cause pain in the occupant's waist in case of travelling for a long time.

The conventional lumbar support has another disadvantage that it can not absorb the vibration and/or the rock of the occupant's body that may occur when travelling on the road, starting or stopping suddenly, thus increasing the occupant's fatigue.

The conventional lumbar support has a further disadvantage that as it can not relax the shock occurred in case of a car crash accident, the occupant may be injured, or seriously, lose his life due to transmitting the shock to the occupant's body as it is.

The conventional lumbar support has another disadvantage that since it can not support the occupant's body when the occupant's body lurches toward one side by the centrifugal force on cornering suddenly, an accident may be occurred by the occupant's precarious position, or the occupant may feel uneasy.

The conventional lumbar support has a still further disadvantage that as it is directly fixed to the seat frame by welding, it has to be designed in various sizes according to the types of the car, can not be standardized, and its installation work is complicated.

SUMMARY OF THE INVENTION

It is, therefore, an object of the present invention to provide a lumbar support for a car seat which can absorb the vibration and the shock well, provide an improved safety and reduce the occupant's fatigue due to travelling for a long time.

Another object of the present invention is to provide a lumbar support for a car seat which is easy in its setting and can be applied to various types of cars.

Further another object of the present invention is to provide a lumbar support for a car seat which has a small number of components, thus being very economical.

According to the present invention, a lumbar support for a car seat comprises a wire frame made of an endless wire member and having two hold parts which are set at two seat frames being stood at both sides of a squab of a separate seat by two connecting means connected to the seat frames and a guide part which integrates with the hold parts and is formed by arranging the wire member of the wire frame in two rows, a support plate made of an elastic leaf spring material, having two flanges which are formed by bending both end parts of the support plate and having a pair of holes through which the wire member of the guide part of the wire frame is passed, and projected in a middle part of the support plate by making narrow the distance between the flanges, and an adjustor for adjusting the height of the projected part of the support plate by regulating the distance between the flanges of the support plate without any steps.

According to the present invention, the lumbar support for a car seat can comfortably support the occupant's lumbar according to any physical conditions of the occupant, since the projecting height of the support plate can be adjusted by handling the adjustor without steps.

BRIEF DESCRIPTION OF THE DRAWINGS

The present invention will become apparent upon reading the following detailed description of exemplary embodiments and upon reference to the accompanying drawings, in which.

DETAILED DESCRIPTION OF THE INVENTION

Figure 1:
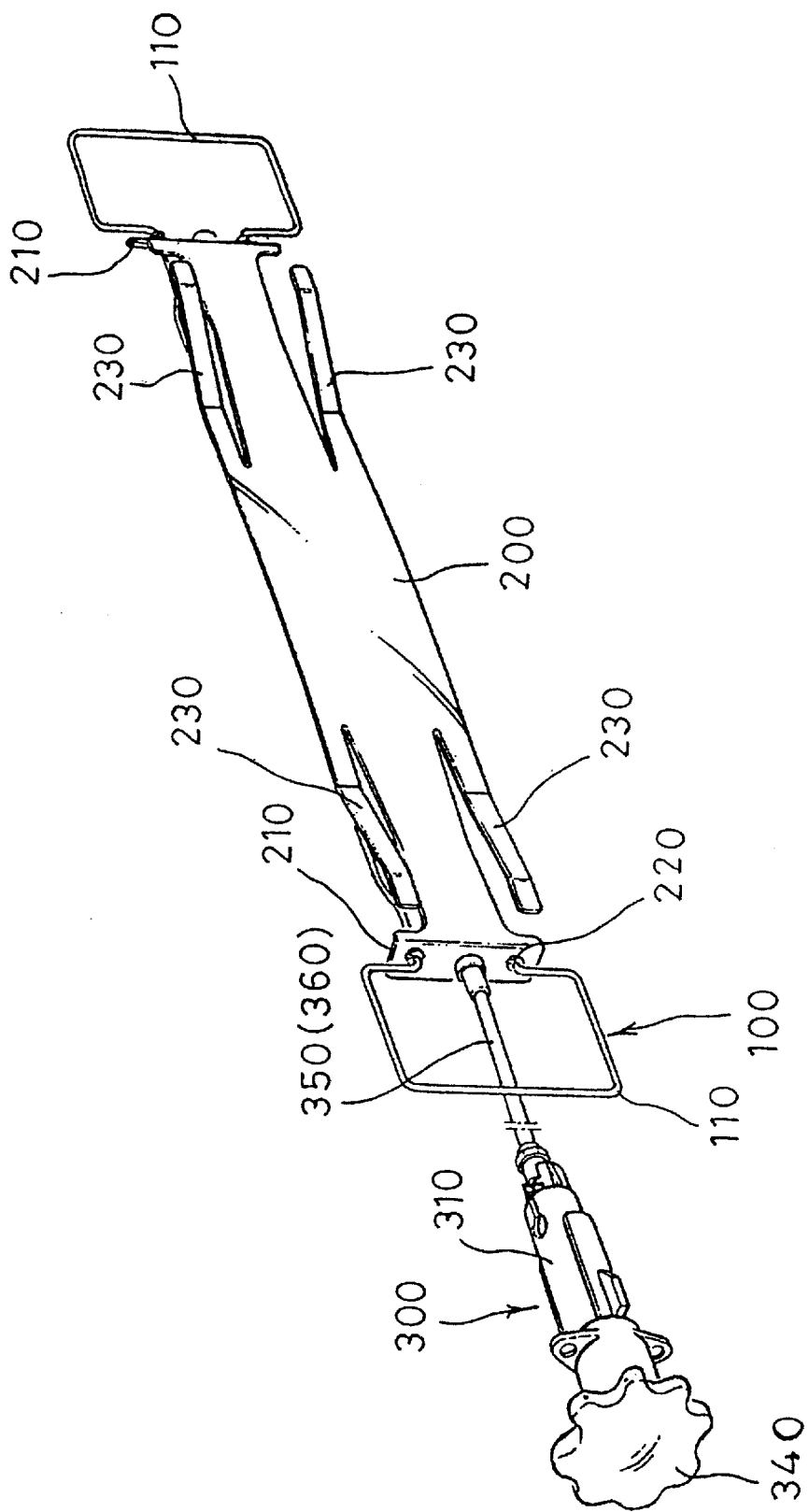
FIG. 1 is a perspective view showing a composition of essential parts of the present invention.

FIG. 1 is a perspective view showing an essential composition of the present invention.

Figure 2:
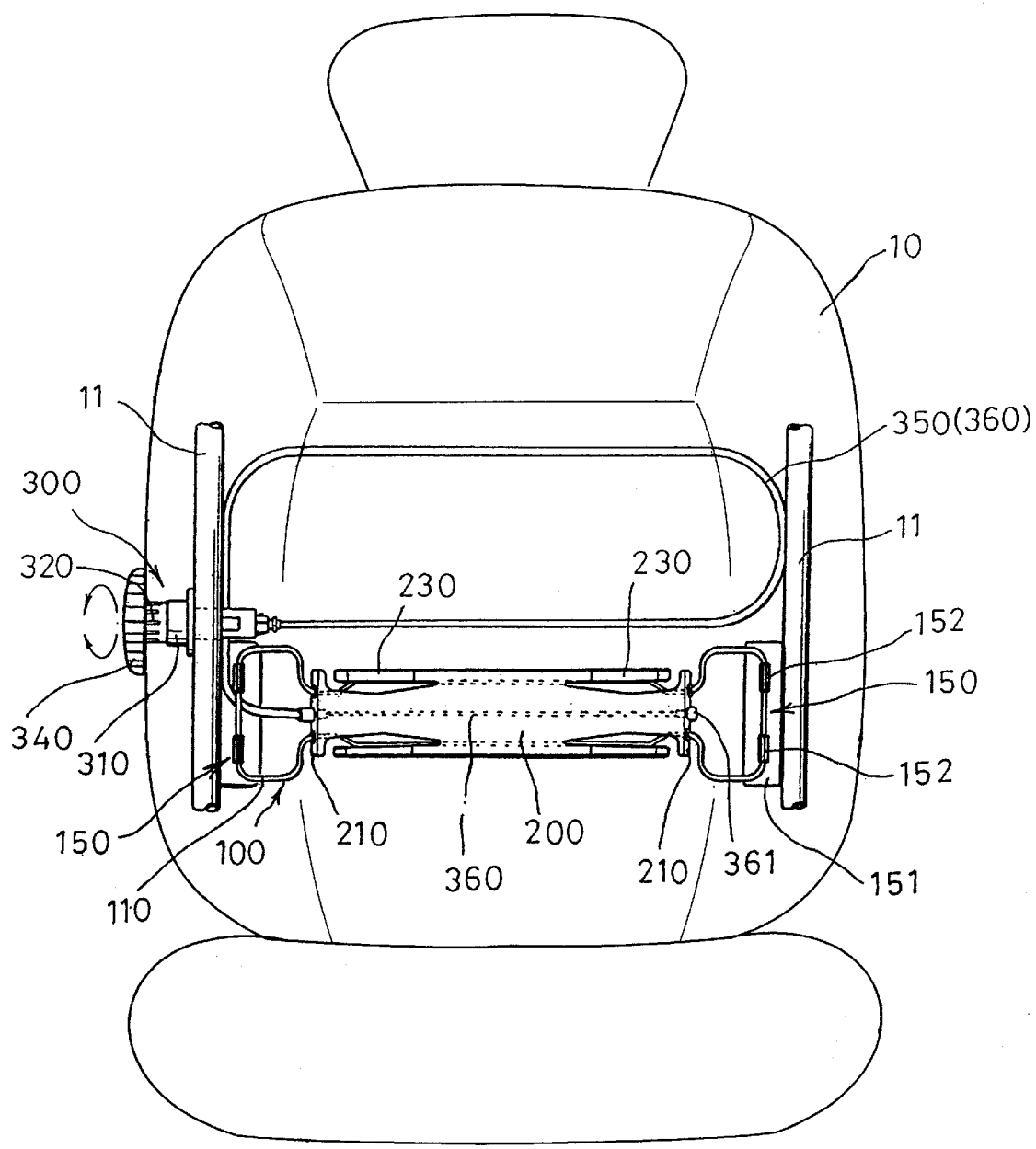
FIG. 2 is a front view showing a composition of the present invention.

FIG. 2 is a front view showing a state that the lumbar support of the present invention is installed between two seat frames 11 located at both end sides of a squab 10 of a seat and a handle 340 of an adjustor 300 is exposed from one side of the squab 10.

Figure 3:
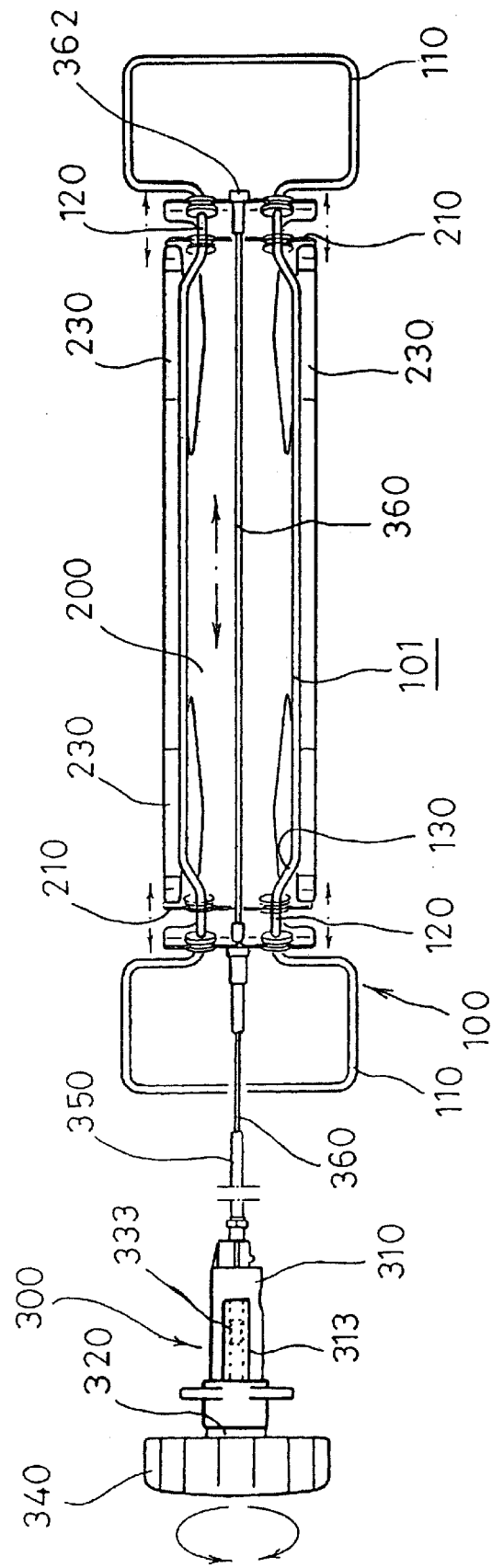
FIG. 3 is a rear view showing an operation state of a support plate by handling an adjustor according to the present invention.

FIG. 3 is a rear view showing an operating state that a distance between both flanges 210 formed at both end parts of a support plate 200 narrows by handling the handle 340 of the adjustor 300.

Figure 4:
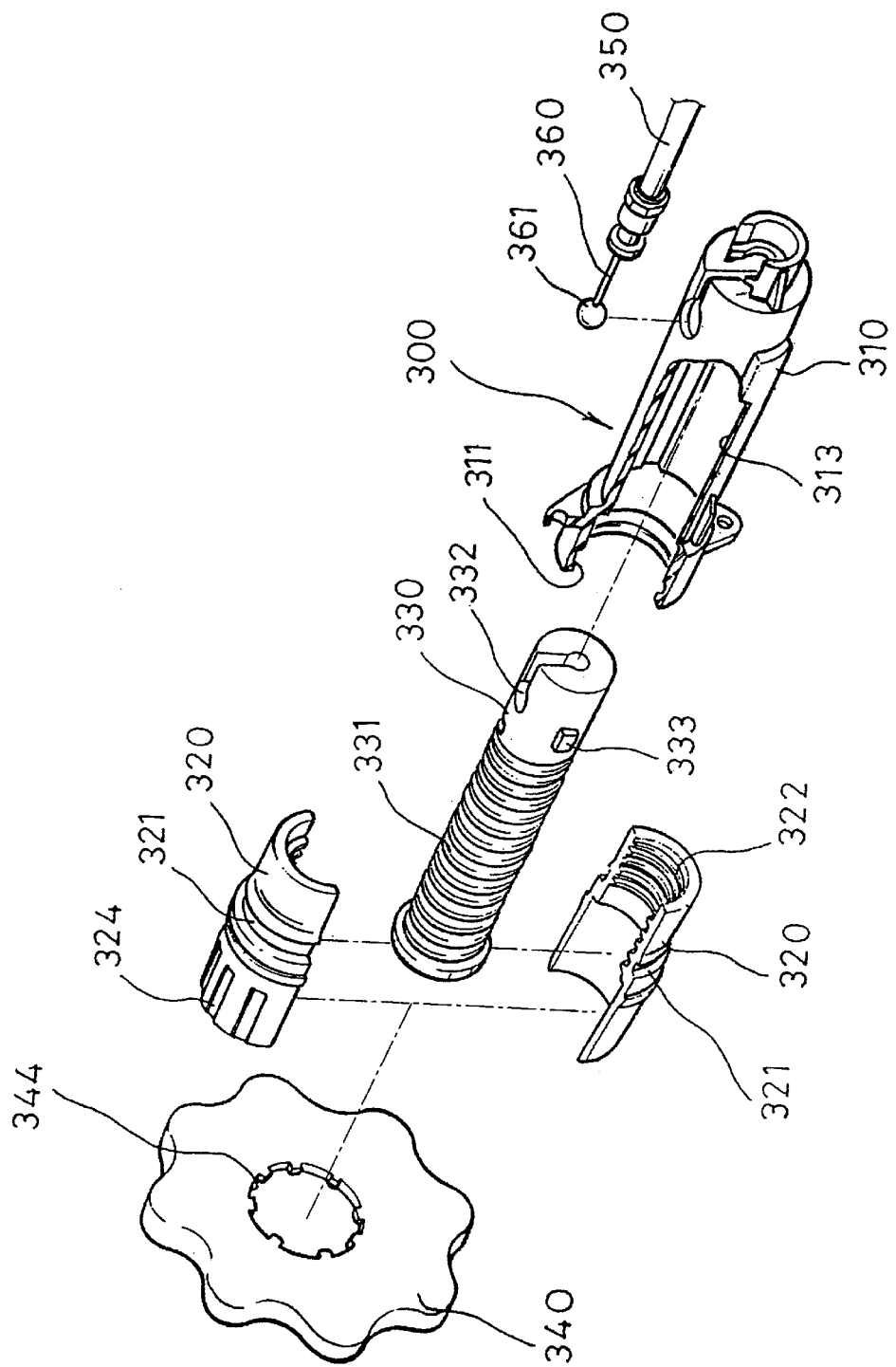
FIG. 4 is a perspective view of the adjustor, with parts broken away and exploded.

FIG. 4 is a perspective view of the adjustor 300, with parts broken away and exploded.

Figure 5:
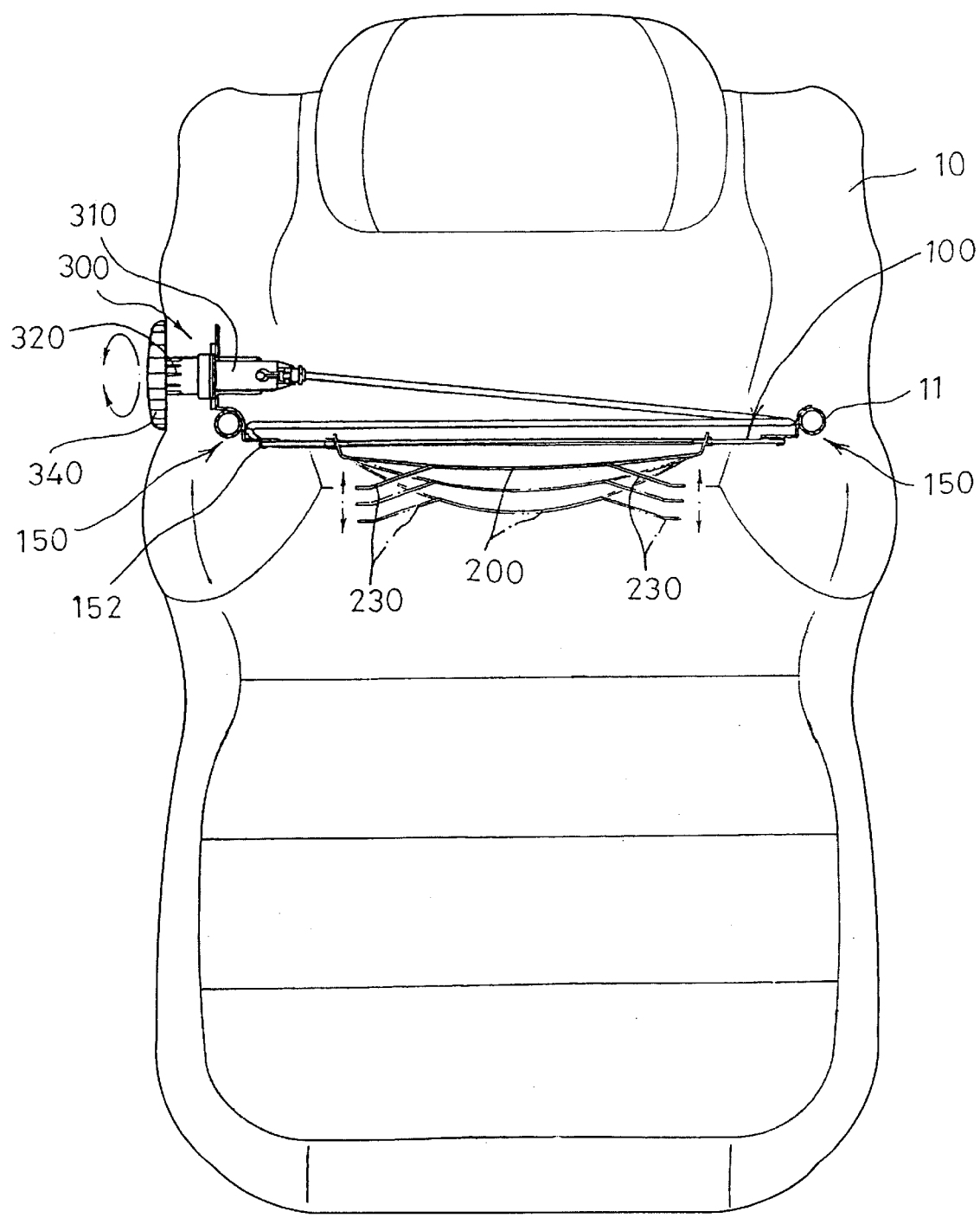
FIG. 5 is a plan view showing a state that the support plate is projected toward a lumbar part by handling a handle according to the present invention.

FIG. 5 is a plan view showing a state that the support plate 200 is projected toward the lumbar part in proportion to the distance between the both flanges 210 of the support plate 200 narrowing or widening by the handle 340 of the adjustor 300.

Figure 6:
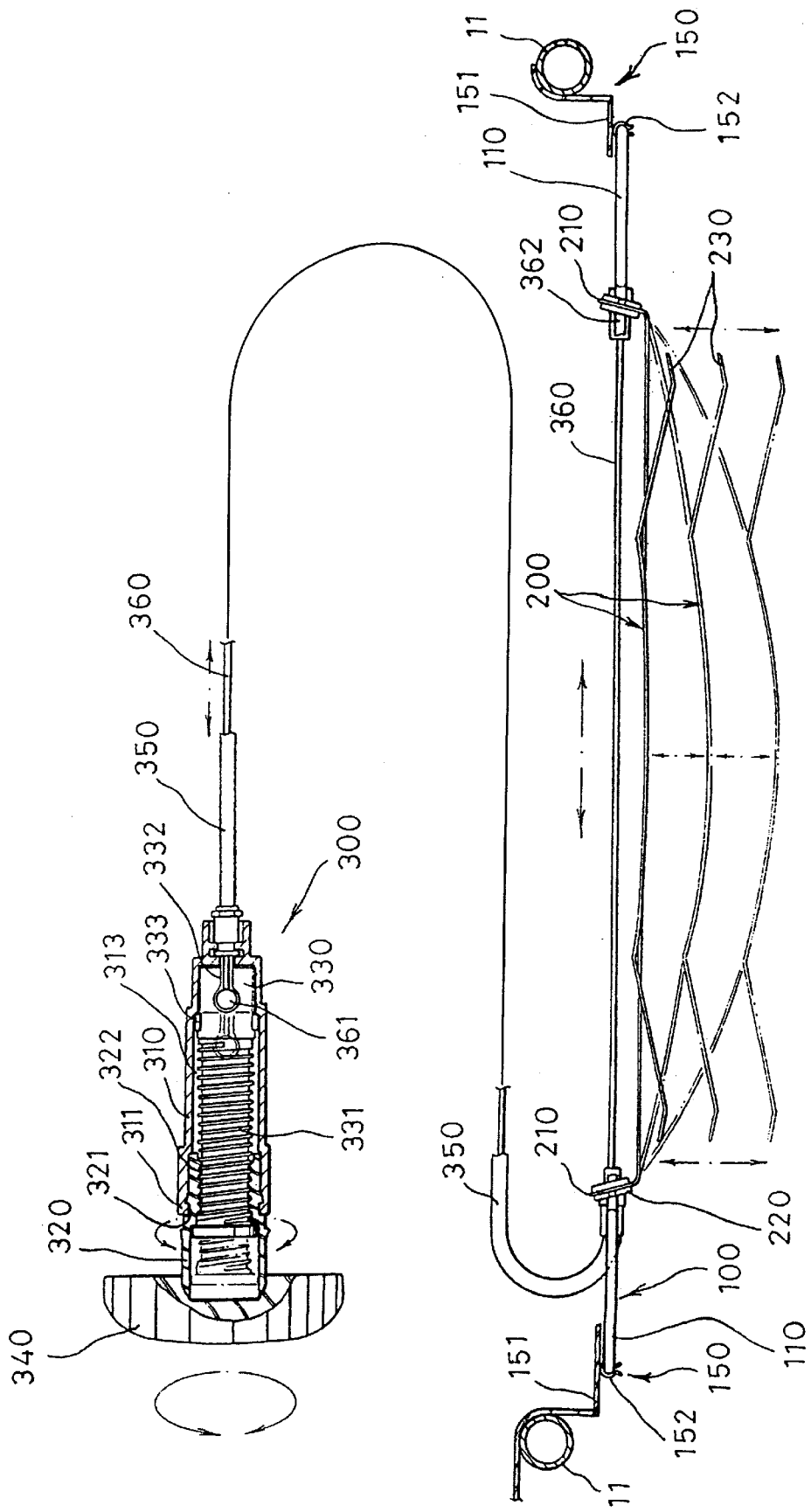
FIG. 6 is a plan view showing an operating relation between the adjustor and the support plate, with connection.

FIG. 6 is an extended plan view showing an operating relation between the adjustor 300 and the support plate 200 according to the present invention.

Figure 7:
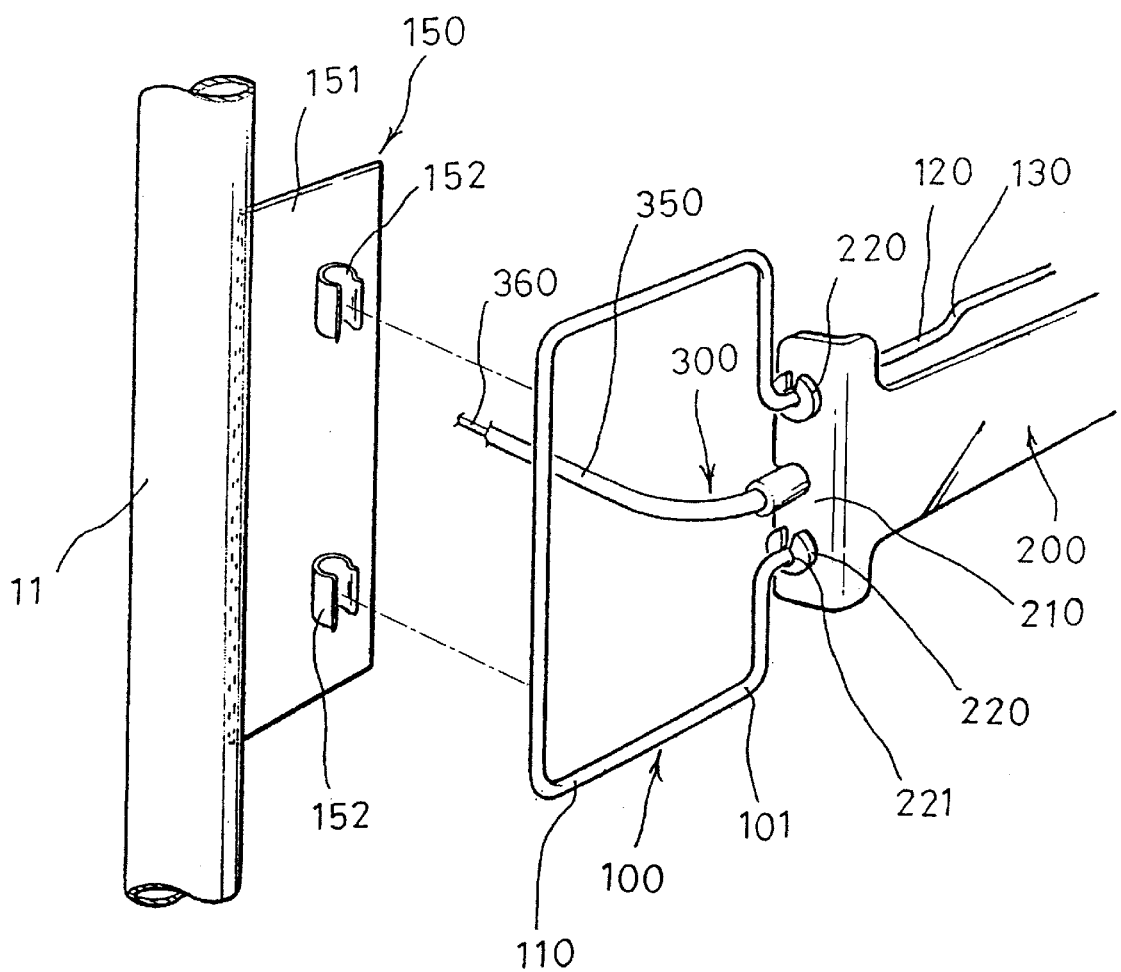
FIG. 7 is a perspective view showing a composition of connecting means fixed to seat frames inside a squab to hold the lumbar support according to the present invention.

FIG. 7 is a perspective view showing a composition of connecting means 150 connected to the seat frames 11 of the squab 10 for mounting the lumbar support according to the present invention.

In FIG. 1, the lumbar support of the present invention comprises a wire frame 110 made of a wire material and serving as a variable and adjustable frame, a support plate 200 made of an elastic leaf spring material and located at a front side of the wire frame 100, and an adjustor 300 for adjusting a projecting height of the support plate 200 projected in a middle part by handling a handle 340.

The wire frame 100 serves as a framework for the support plate 200, and is made of an endless wire member 101 with the thickness of 3–6 mm to reduce the weight of the lumbar support and to smoothly guide the projection performance of the support plate 200.

As shown in FIGS. 2 and 3, the wire frame 100 is bent, so that it has two rectangular-shaped hold parts 110 at both end sides thereof and a guide part 120 integrating with the hold parts 110, being located between both hold parts 110 and guiding the support plate 200.

The hold parts 110 are set to both seat frames 11 vertically stood at the sides of the squab 10 by the connecting means 150. The hold parts 110 may be directly fixed to the seat frames 11 by welding, but its operation efficiency is lowered and its preservation and repair are very difficult. Therefore, it is preferable that the hold parts 110 are set to the seat frames 11 by clips 152 elastically holding the hold parts 110 as shown in FIG. 7 so as to be more easy in its installation and repair, and a change of its components. The clips 152 are fixed at upper parts and lower parts of a pair of brackets 151 connected to each seat frame 11 to hold the wire member 101 of the hold parts 110. Since the clips 152 grasp upper end corners and lower end corners of the hold parts 110, the wire frame 100 can not be moved not only right and left but also up and down.

The lumbar support of the present invention is detachably mounted in the squab 10 and is easy in its assembly and change of its components, since being set by the clips 152. The wire member 101 of the guide part 120 which is extended from the hold parts 110 is arranged in two rows to guide the projection performance of the support plate 200. The width between an upper wire member and a lower wire member of the guide part 120 is narrower than the vertical width of the hold parts 110. The operation of the guide part 120 is restricted by two stepped parts 130 thereof which have a vertical width wider than that of the guiding part 120 and are formed at both sides of the guide part 120.

When the occupant reduces the distance between the flanges 210 by handling the handle 340 of the adjustor 300, the stepped parts 130 of the guide part 120 prevent the support plate 200 from being projected over the resilient limits of the support plate 200 so as to prevent an injury of the lumbar support and a pressure on the occupant's body.

By the stepped parts 130 of the guide part 120, the flanges 210 are operated only within the optimum range of the guide part 120 which allows the flanges 210 to slide right and left in due consideration of the maximum and minimum height limits of the support plate 200 necessary for supporting the occupant's lumbar part, so that the lumbar support can always support the occupant's lumbar part in the most suitable condition.

As described above, the elastic variable support plate 200 for supporting the occupant's lumbar part is made of elastic leaf spring material, and has the middle part of the support plate 200 which is adjustably projected by controlling the distance between the both flanges 210 of the support plate 200.

As shown in FIGS. 1 and 2, the support plate 200 is a leaf spring material with an uniform thickness, the flanges 210 of the support plate 200 are formed by bending the end parts of the support plate 200 at a right angle, and the wire member 101 of the guide part 120 of the wire frame 100 passes through upper and lower holes of the flanges 210.

To more smoothly slide the wire member 101 into the holes of the flanges 210, the flanges 210 have guide rings 220 made of a synthetic resin material around the holes. The wire member 101 passes through holes 221 of the guide rings 220 to smoothly slide without noise. According to the above composition, the distance between the flanges 210 of the support plate 200 can be freely adjusted within the range to the stepped parts 130 of the guide part 120 by the adjustor 300, so that the middle part of the support plate 200 can be projected toward the occupant's lumbar part to the height suitable for the occupant's body conditions as shown in FIGS. 5 and 6.

When the car is shaken and shocked during travelling, the projected middle part of the support plate 200 absorbs the vibration or the shock by its elastic stress. Because even though not only small vibration but also great shock are occurred, it in itself can absorb the vibration and the shock in proportion to their acted power, the lumbar support according to the present invention can protect the occupant's body. Therefore, the lumbar support of the present invention can improve its safety and reduce the occupant's feeling of fatigue.

It is preferable that the support plate 200 has four support wings 230 at right and left sides thereof, and up and down as shown in the Figures. The support wings 230 are formed in integration with the support plate 200 by punching with a press, and bent in an opposite direction from the projection direction of the support plate 200 in order to support the occupant's waist. The support wings 230 support the occupant's waist when the occupant's body is leaned in an opposite direction of a turning direction of the car due to the centrifugal force during cornering, so that they can reduce the rock of the occupant's body. Even in case of a severe collision, the support wings 230 can more safely support the occupant's waist because the projected middle part of the support plate 200 is retreated toward a middle part of the wire frame 100 to relieve the impact. The support wings 230 can prevent the impact from being transmitted to the occupant's upper body and the occupant's body from being broken away from the car seat or shaking, thus more improving its safety.

The composition of the adjustor 300 for adjusting the extent of projection of the middle part of the support plate 200 is shown in FIG. 6.

The adjustor 300 according to the present invention includes a housing 310 shaped into a hollow tubular form and having a protrusion 311 located at an end part of the housing 310, a sleeve 320 having a groove 321 which catches the protrusion 311 of the housing 310 and rotates with the protrusion and an internal thread 322, a movable body 330 having a screw 331 which is formed at an outer surface of the movable body 330 and is screwed on the internal thread 322 of the sleeve 320 and a setting groove 332 formed at a rear end part of the movable body 330, a handle 340 coupled with the sleeve 320 rotatably and exposed outside the squab 10, a cable member 350 which is a pliable tube and connects the housing 310 and the one of the flanges 210 of the support plate 200, and a release wire 360 having a fixing means 361 which is located at one end thereof, passes through the cable member 350 and is inserted in the setting groove 332 of the movable body 330 and a fixing pin 362 which is located at the other end thereof and hangs the release wire 360 on the other flange 210 of the support plate 200.

As the release wire 360 and the cable member 350 which wraps the release wire 360 are pliable, even though the handle 340 of the adjustor 300 is mounted at any locations of the outside of the squab 10, the turning performance of the handle 340 can be transmitted through the release wire 360 to the support plate 200 which is assembled with the wire frame 100 and mounted at the inside of the squab 10.

The projecting height of the support plate 200 can be adjusted by handling the handle 340 in a manner as follows.

The handle 340 and the sleeve 320 have a female toothed part 344 and a male toothed part 324 respectively so as to be coupled with each other and turned together. The groove 321 of the sleeve 320 is coupled to the protrusion 311 of the housing 310 to be freely rotated without moving toward a longitudinal direction. At this time, the screw 331 of the movable body 330 screwed with the internal thread 322 of the sleeve 320 can be moved in a forward direction or a backward direction of the screw 331 according to the turning direction of the handle 340.

To prevent the movable body 330 from rotating with the sleeve 320, the movable body 330 has a guide protrusion 333, and the housing 310 has a longitudinal guide groove 313 for guiding the guide protrusion 333 to be moved forward or backward. The movable body 330 screwed in the sleeve 320 can be moved forward and backward by turning the handle 340, and the release wire 360 can be moved forward and backward together with the movable body 330 because the fixing means 361 of the end part of the release wire 360 is inserted in the setting groove 332 of the movable body 330. The other end part of the release wire 360 is hung on the other flange 210 of the support plate 200 by the fixing pin 362. The release wire 360 is pulled by turning the handle 340 of the adjustor 300 in the forward direction of the screw 331 of the movable body 330.

The cable member 350 for guiding the release wire 360 is not moved when the release wire 360 is moved forward or backward. The cable member 350 is fixed at the one of the flanges 210 of the support plate 200 and the release wire 360 which is hung on the other flange 210 of the support plate 200 by the fixing pin 362 is pulled by handling the handle 340, so that the middle part of the support plate 200 can be projected in proportion to the pulled extent of the release wire 360 as shown along an imaginary line of FIG. 6.

The movement length of the release wire 360 is defined by the rotation number and the rotation angle of the handle 340 and the projection of the support plate 200 is changed in proportion to the pulled extent of the release wire 360, so that the projecting height of the support plate 200 for supporting the occupant's lumbar may be adjusted without any additional steps. Therefore, the lumbar support according to the present invention can freely adjust the projecting height of the support plate 200 for supporting the occupant's lumbar in an optimum state according to the occupant's body conditions.

When the vibration or the impact is transmitted to the projected support plate 200 during travelling, since the projected part of the support plate 200 is retreated in proportion to the acted power, the lumbar support can absorb the vibration and the impact, even heavy vibration and impact.

The elastic support plate 200 is a plane in normal state, but increases the elastic force thereof if the height of the projected part is growing more and more by pulling the release wire 360. As if the height of the projected part of the support plate 200 grows, the displacement range for absorbing the impact also grows, the lumbar support can absorb more heavy impact. The resilient power of the support plate 200 for supporting the lumbar part is increased in case of narrowing the distance between both flanges 210 of the support plate 200 by handling the handle 340, and reduces in case of widening the distance.

As described hereinabove, the lumbar support according to the present invention can be manufactured as a standardized lumbar support, mounted on the seat easily, used in various types of car for common use, semi-permanently used as made of a special steel material, easily change the setting location of the handle of the adjustor, more comfortably support the occupant's lumbar since having a good spring cushion function, reduce the occupant's fatigue during a long distance travel, and improve its safety as having a shock absorbing effect in case of a car collision.

Those skilled in the art will readily recognize that these and various other modifications and changes may be made to the present invention without strictly following the exemplary application illustrated and described herein and without departing from the true spirit and scope of the present invention, which is set forth in the following claims.

What is claimed is:

1. A lumbar support for a car seat, comprising:

a seat frame;

a laterally extending wire frame being made of a wire member, the wire frame having two hold parts connected on opposing sides of the seat frame and a guide portion which integrates with the hold parts and of which the wire member of the wire frame is arranged in two rows;

a support plate being made of an elastic leaf spring material and having upper and lower edges, the support plate having two flanges and opposing end parts, the support plate being projected in a middle part thereof by narrowing the distance between the flanges in order to support an occupant's lumbar, the flanges located at each end of the support plate and extending perpendicularly therefrom, and having a pair of openings through which the wire member of the guide portion passes;

a pair of support wings formed along at least a portion of each of the upper and lower edges of the support plate such that opposing support wings are vertically spaced, the support wings extending substantially outward from the support plate in a non-planar configuration relative to the support plate; and an adjustor operably engaging the support plate and providing means for adjusting a height of the projected middle part of the support plate by regulating the distance between the both flanges of the support plate.

2. A lumbar support for a car seat according to claim 1, wherein the adjustor comprises a housing shaped into a hollow tubular form and having a protrusion at a front end part thereof, a sleeve having a groove which catches the protrusion of the housing and rotates with the protrusion and an internal thread therein, a movable member having a screw which is formed at an outer surface thereof and screwed on the internal thread of the sleeve and a setting groove formed at a rear end part thereof, a handle rotatably coupled with the sleeve and exposed outside the seat frame, a cable member being a pliable tube and being connected to the housing and one of the flanges of the support plate, and a release wire passing through the cable member and having a fixing member at one end of the release wire and a fixing pin at the other end of the release wire, the fixing member being inserted in the setting groove of the movable member, and the fixing pin serving for hanging the release wire on the other flange of the support plate.

3. A lumbar support for a car seat according to claim 1, wherein the guide portion of the wire frame has two stepped parts at both sides of the guide portion, the stepped parts being formed for limiting an operation of the support plate to prevent the support plate from projecting over its resilient limits.

4. A lumbar support for a car seat according to claim 1, wherein the hold parts of the wire frame are connected to the seat frame by a connecting assembly having two brackets fixed at the opposing sides of the seat frame and four clips being fixed at front surfaces of the brackets up and down and elastically holding the wire member of the hold parts.

5. A lumbar support for a car seat according to claim 1, wherein the openings formed in each flange of the support plate have guide rings which are set at each opening and through which the wire member passes.

6. A lumbar support for a car seat according to claim 2, wherein the movable member of the adjustor has a guide protrusion, and the housing has a guide groove for guiding the guide protrusion to move forward and backward longitudinally.

7. A lumbar support for a car seat according to claim 1, wherein the support wings are an integral part of the support plate.

8. A lumbar support for a car seat according to claim 1, wherein the support wings provide support to the waist of an occupant of the seat.

9. A lumbar support for a seat, comprising:

a laterally extending wire frame having a guide portion integrally disposed between two hold parts, the hold parts adapted to be attached at opposing sides of the seat;

a resilient support plate having an intermediate section with upper and lower edges and two flanges formed at opposing ends of the intermediate section, each of the flanges having a pair of openings adapted for passing the guide portion of the wire frame;

a pair of support wings formed along at least a portion of each of the upper and lower edges of the support plate such that opposing support wings are vertically spaced, the support wings extending substantially outward from the support plate in a non-planar configuration; and an adjustor operably engaging the support plate and providing means for adjusting a deformation of the intermediate section of the support plate by regulating the distance between the flanges.

10. A lumbar support for a seat as defined in claim 9, wherein the wire frame comprises an endless wire member.

11. A lumbar support for a seat as defined in claim 9, wherein the guide portion of the wire frame comprises at least two stepped parts that limit the support plate from projecting over its resilient limits.

12. A lumbar support for a seat as defined in claim 9, wherein the hold parts are removably attached to the seat.

13. A lumbar support for a seat as defined in claim 9, wherein the hold parts are attached to the seat by a connecting assembly.

14. A lumbar support for a seat as defined in claim 13, wherein the connecting assembly comprises at least two brackets fixed at opposing sides of the seat and two retaining clips fixed along a surface facing of each of the brackets.

15. A lumbar support for a seat as defined in claim 9, wherein the flanges of the support plate are formed perpendicular to the intermediate section of the support plate.

16. A lumbar support for a seat as defined in claim 9, wherein the support plate consists of an elastic leaf spring material.

17. A lumbar support for a seat as defined in claim 9, wherein the support wings are formed as an integral part of the support plate.

18. A lumbar support for a seat as defined in claim 9, wherein the support wings provide support to the waist of an occupant of the seat.

19. A lumbar support for a seat as defined in claim 9, wherein the adjustor comprises:

a housing shaped into a hollow tubular form and having a protrusion at a front end thereof;

a sleeve including a groove which catches the protrusion of the housing and rotates with the protrusion and an internal thread therein;

a movable member having a screw formed at an outer surface thereof and adapted to be screwed on the internal thread of the sleeve and a setting groove formed at a rear end part thereof;

a handle rotatably coupled with the sleeve and exposed outside the seat;

a cable member being a pliable tube and being connected to the housing and one of the flanges of the support plate; and a release wire passing through the cable member, the release wire having a fixing member disposed at a first end and a fixing pin disposed at a second end, the fixing member adapted to be inserted in the setting groove of the movable member and the fixing pin serving for retaining the second end of the release wire on the opposing flange of the support plate.

20. A lumbar support for a seat as defined in claim 19, wherein the movable member comprises a guide protrusion and the housing comprises a guide groove for guiding the guide protrusion forward and backward longitudinally.

* * * * *